3,048,494
JOINT SEALING COMPOSITIONS

Edgar W. Sawyer, Jr., Metuchen, N.J., assignor to Minerals & Chemicals Philipp Corporation, a corporation of Maryland
No Drawing. Filed June 2, 1959, Ser. No. 817,496
15 Claims. (Cl. 106—278)

The present invention relates to improved joint sealing or filling compounds of the type which must be substantially free from sag under the influence of heat. The invention particularly concerns improved bituminous joint sealing compounds such as, for example, the spotweld sealers required by the automotive industry for sealing the spotweld seams between top and drip rail, between top assembly and side panel, between cowl and sides of automobile, etc., prior to painting the resulting welded structures and subsequently baking the paint or enamel thereon.

Automotive sealers, such as the aforesaid spotweld sealers, are employed to fill in and seal welded seams so that the seam will not leak moisture and will be protected from corrosion. Such sealers, in the form of a thick plastic mix, are conventionally applied to a seam in the form of a bead by a caulking gun or like extruding device. The seam is then heated to harden or set the bead.

The sealer should be of such composition that it will not bleed through subsequent paint films or alter the strength of the weld in any way, and it should have resistance to sag at paint baking temperatures. The term sag, as used in the joint sealing art, refers to the tendency of a sealer to flow. Paint or enamel baking temperatures in the automotive industry usually run from about 275° F. to about 400° F. and thus joint sealing compounds should not soften at these temperatures to the extent that they sag appreciably and thus tend to flow out of the seams to which they have been applied. In addition to the aforementioned properties, a spotweld sealer must have sufficient fluidity so that it can be applied in the form of a bead by a caulking gun or the like. Moreover, the composition must maintain such consistency during storage and must not unduly thicken or lose body after its preparation and before use. Moreover, the sealer must be adherent to metal on initial application and must retain its adhesive characteristics both during heating to set the sealer and after heating during use. The sealer must also be carefully formulated to prevent oil exudation when the composition is heated.

A variety of spotweld sealers are used, such sealers generally being based on a bituminous and/or resinous material in which is mixed particulate inorganic filler material which serves the purpose, among other things, of bodying the base material to a suitable consistency for application, minimizing the tendency of the sealer to crack during use and reducing somewhat the flow of the composition at elevated temperatures. A principal disadvantage of such composition is that they flow, usually appreciably, at elevated temperature and the sealer runs out of the seam with obvious deleterious effect.

An improved sag-resistant joint sealing composition designed to obviate the aforementioned disadvantages is disclosed in a copending patent application, Serial No. 618,695, filed October 29, 1956, now Patent No. 2,894,848, in which I am a coinventor. The compositions of the aforementioned patent application are characterized by a clay colloidally dispersed in a bituminous base material in the presence of a cationic surface active agent, namely an imidazoline. The colloidally dispersed clay seems to impart a gel-like structure to the composition which apparently accounts for its sag-resistance at elevated temperature. Although performing their intended function satisfactorily, the improved joint sealing compositions of said copending application when formulated with certain asphaltic base material are not completely satisfactory after they have been stored for a prolonged period, such as a month or more, in that they gradually stiffen to an extent such that they cannot be applied by a caulking gun and, moreover, they lose their ability to adhere to metal.

Accordingly, it is a principal object of my invention to overcome the aforementioned limitations and disadvantages of spotweld sealers employing colloidally dispersed clay.

It is another object of the present invention to provide improved joint sealing compositions, suitable for application by conventional caulking equipment after no preliminary heat softening treatment, which resist softening and sag at elevated temperatures and which have excellent adhesion to metal both before, after and during heating.

It is another object of the invention to provide improved joint sealing compositions for use in automotive weld seams which have excellent storage stability and which substantially resist sag when subjected to paint baking temperatures up to about 400° F. after application.

It is still another object of the invention to furnish a process for preparing the improved joint sealing compound of the invention.

Other objects and features of the invention will be readily apparent from the complete description thereof which follows.

I have discovered, in connection with the production of bituminous joint sealing compositions adapted particularly for automotive seam welding, that excellent results are realized when clay is colloidally dispersed in the presence of certain fatty acid amides in an essentially paraffinic oil in which is suspended comminuted gilsonite.

Stated briefly, the joint sealing compositions of the present invention contain, as essential ingredients: comminuted gilsonite in an amount from about 15 percent to about 40 percent, based on the weight of the composition; an essentially paraffinic oil in an amount from about 40 percent to about 60 percent by weight of the composition; a high surface area clay colloidally dispersed in the oil in an amount from about 5 percent to about 20 percent by weight of the composition; and from about 10 percent to about 50 percent, based on the weight of the clay, of a fatty acid amide. The use of the fatty acid amides is a critical feature of my compositions inasmuch as satisfactory compositions are not produced in their absence nor have I found other compounds which perform in comparable manner. In addition to the aforementioned ingredients, my compositions normally contain a reinforcing filler, particularly dry asbestos, which imparts strength and stability against cracking of the final sealing compound. The joint sealers of the present invention may contain, in addition to the above-mentioned material, various ingredients of a minor or supplemental nature, e.g., rubber, certain resins, natural and synthetics, bituminous substances, other than the gilsonite, pentaerythritol, etc.

My compositions have a suitable consistency for application with a caulking gun after no, or at least a minimum of preliminary heat softening treatment and maintain such consistency even upon prolonged storage. The compositions have excellent adhesion to metals upon initial application thereto and retain their adhesiveness during heating and after heating. A distinguishing characteristic of my compositions is that they are substantially free from sag or flow at elevated temperatures (such as 400° F. or higher) even when such elevated temperatures are maintained for relatively long periods, such as an hour.

An important feature of my compositions is that they are supplied with the gilsonite in particulate form, suspended in the oil, rather than dissolved in the oil. For this reason the use of gilsonite solvents is to be avoided in the compositions. After the composition is applied to the seam and heated to paint baking temperatures the gilsonite is dissolved in situ into the paraffinic oil present. This solution upon cooling to ambient temperatures is a hard adhesive substance.

In preparing the joint sealing compositions of my invention, the preferred procedure is initially to form a uniform mixture of clay, oil and amide, utilizing low shear so as to avoid formation of a gel-like mass which would result from the application of high shear to such a combination of materials. The gilsonite powder is then blended into the mixture and the whole is then subjected to high shear to disperse the clay into its ultimate colloidally dimensioned particles with resultant formation of a rather stiff, gel-like mass. The filter is then blended into the gel. Numerous embodiments of this method are possible. Thus, for example, the clay may be uniformly blended with amide so as to form a surfactant modified clay and the clay thus modified added to the oil. Irrespective of the specific procedure or order of addition of materials, it is essential to the realization of a satisfactory, sag-resistant product that the clay be colloidally dispersed in the oil since when the clay is merely mixed in the oil in the form of coarse lumps or aggregates, as opposed to colloidally dimensioned particles, the composition will not exhibit the desired resistance to sag at elevated temperatures. As examples of suitable high shear equipment may be cited colloid mills of various designs and roller mills.

More specifically, the oil I employ is essentially completely paraffinic in nature, e.g., white mineral oil. The oil should be substantially free from volatiles and liquids which are solvents for gilsonite at room or storage temperature.

As the colloidal clay component, any naturally occurring clay which has a surface area, after drying to a temperature of 350° F., of 50 square meters per gram or more, and preferably 100 square meters per gram or more, may be used. By surface area, as mentioned above, is meant that surface area which is determined by a nitrogen adsorption method described by S. Brunauer, P. H. Emmet, and E. Teller in their article entitled "Adsorption of Gases in Multi-Molecular Layers," on page 309 of Journal of the American Chemical Society, vol. 60, February 1938, using the molecular size data of H. K. Livingston presented in his article entitled "Cross-Sectional Areas of Molecules Adsorbed on Solid Surfaces," on page 569, Journal of the American Chemical Society, vol. 66, April 1944. The clays particularly adaptable in the process of the present invention are the sub-bentonites (which are a class of nonswelling montmorillonite clays), nontronite, illite, hectorite, beidellite, saponite, halloysite, sepiolite and attapulgite. The surface areas of the above-identified clays are all in excess of 50 square meters per gram. Attapulgite (Georgia-Florida fuller's earth), which has been found to be particularly suitable in the practice of the invention, possesses a surface area, as measured by the above-identified method, of from about 200 to about 220 square meters per gram.

Raw clay (which ordinarily has a free moisture content of 35% to 50% or higher), after suitable grinding and crushing, is particularly suitable for use in the preparation of the joint sealing compound. If desired, the clay may be degritted by means well-known to those skilled in the art. The free moisture content of the clay used in preparing the composition is usually 35 percent to 50 percent or higher, there being no upper limit to the free moisture content of the clay I employ other than that dictated by the adverse economics of transporting very moist clay. I may use clay having a free moisture content as low as 10 percent. However, clays having a free moisture content less than about 10 percent are not suitable since the clay particles draw together during drying to such low moisture content and the clay cannot be satisfactorily dispersed. The term "free moisture" (F.M.), as used herein refers to the weight percentage of the clay eliminated by heating essentially to constant weight at 250° F. The term is distinguished from "volatile matter" (V.M.) which refers to the weight percentage of the clay eliminated by heating essentially to constant weight at 1800° F.

The fatty acid amide which I employ is a water-dispersible nonionic compound represented by the following structural formula:

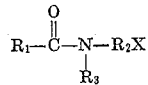

wherein: $R_1$ is selected from the group consisting of alkyl and alkenyl groups having from 7 to 17 carbon atoms; $R_2$ is an alkylene group having from 2 to 4 carbon atoms; $R_3$ is selected from the group consisting of hydrogen, alkyl and alkanol groups having from 2 to 4 carbon atoms; and X is selected from the group consisting of OH and H. I may use these materials singly or in various combinations thereof.

I have found that fatty acid alkanolamides are a particularly suitable class of material for the purposes of my invention because of their low cost and efficiency. As examples of this class of amides may be cited: oleic acid diethanolamide, coconut oil fatty acid monoethanolamide, stearic acid diethanolamide, stearic acid monoethanolamide and lauric acid diethanolamide. The amide is employed in an amount within the range of from about 10 percent to about 50 percent, based on the weight of the clay in the formulation. Preferably, the amide is used in an amount within the range of about 20 percent to about 33⅓ percent, same basis.

Other materials may be employed in combination with the gilsonite in the joint filling compounds, as examples of which may be cited petroleum asphalts, natural resins as, for example, rosins, copals, batus, etc.; synthetic resins (which may be straight or modified) as, for example, alkyd resins, phenolic resins, etc.; and latex type resins as, for example, polystyrene, butadiene-acrylonitrile copolymers, polyvinyl acetate, chlorinated rubber, etc. The aforementioned resins are frequently referred to as "coatings resins." Moreover, various ingredients for the purpose of improving or adjusting certain properties of the mix or of the final composition can, of course, be incorporated into the mixture at any state of the process within the scope of the invention. Asbestos (preferably dried asbestos) or other fibrous material may be added as a reinforcing filler. A thermal stabilizing agent as, for example, pentaerythritol may be added if desired. Plasticizers, anti-freeze materials, and many other types of substances can be included in the formulation if these are deemed necessary or desirable.

Following are examples of the practicing of certain embodiments of my invention included for purposes of illustration only. It should be clearly understood that the invention is not limited to these illustrative embodiments since many other embodiments exist within its scope.

*Example I*

A mixture containing 525 parts by weight light mineral oil, 140 parts by weight colloidal attapulgite clay (V.M. 25%, F.M. 15%), and 28 parts by weight of coconut oil fatty acid amide of diethanolamine were mixed to apparent homogeneity for about 30 seconds in a Waring Blendor, the mixing time being insufficient to gel the system. 350 parts by weight of powdered gilsonite was blended into the mixture and the whole thickened by one passage through a Tri-Homo colloid mill operated at a rotor speed of 10,000 r.p.m. and a rotor clearance of 0.010 inch. 3.5 parts by weight of asbestos, previously dried overnight at 300 F. to remove free moisture, was blended into the thickened composition.

The flow resistance, or resistance to sag, of the composition was determined by applying a ½-inch extruded bead of the sealer into a spot welded assembly with a clearance of 0.200 inch and then leaving the assembly, in vertical position in an oven maintained at 325° F. for an hour. It was found that under such test conditions the composition did not flow out of the seam.

Similar results were realized by varying the clay amide ratio in the composition to 140 parts clay to 40 parts amide.

*Example II*

Still another joint sealer of my invention is formulated as follows:

| | Parts by weight |
|---|---|
| Light white mineral oil | 50 |
| Gilsonite | 30 |
| Stearic acid monoethanolamide | 3 |
| Spanish sepiolite (—325 mesh) | 14 |
| Dry asbestos | 3 |

*Example III*

Another formulation is as follows:

| | Parts by weight |
|---|---|
| Light white mineral oil | 46 |
| Gilsonite | 35 |
| Lauric acid diethylamide | 5 |
| Hectorite | 12 |
| Dry asbestos | 2 |

*Example IV*

A further modification is as follows:

| | Parts by weight |
|---|---|
| Light white mineral oil | 49 |
| Gilsonite | 30 |
| Lauric acid diethanolamide | 3 |
| Attapulgite | 8 |
| Dry asbestos | 6 |
| Kaolin clay | 4 |

I claim:

1. A composition for filling joints, which is substantially free from sag at elevated temperatures consisting essentially of from about 15 percent to about 40 percent by weight of comminuted gilsonite suspended in from about 40 percent to about 60 percent by weight of paraffin oil; from about 5 percent to about 20 percent by weight of a naturally occurring colloidal clay having a surface area of at least 50 square meters per gram, colloidally dispersed therein; and from about 10 percent to about 50 percent, based on the weight of said clay, of a fatty acid amide of the following structural formula:

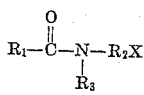

wherein: $R_1$ is selected from the group consisting of alkyl and alkenyl groups having from 7 to 17 carbon atoms; $R_2$ is an alkylene group having from 2 to 4 carbon atoms; $R_3$ is selected from the group consisting of H, alkyl and alkanol groups having from 2 to 4 carbon atoms; and X is selected from the group consisting of OH and H.

2. The composition of claim 1 in which the clay is attapulgite.

3. The composition of claim 1 in which X of the fatty acid amide is an hydroxyl group.

4. The composition of claim 3 in which the clay is attapulgite.

5. A composition for filling joints, which is substantially free from sag at elevated temperatures consisting essentially of from about 15 percent to about 40 percent by weight of comminuted gilsonite suspended in from about 40 percent to about 60 percent by weight of a paraffinic oil; from about 5 percent to about 20 percent by weight of a naturally occurring colloidal clay having a surface area of at least 50 square meters per gram, colloidally dispersed therein; from about 10 percent to about 50 percent, based on the weight of said clay, of a fatty acid amide of the following structural formula:

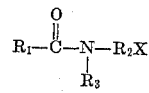

wherein: $R_1$ is selected from the group consisting of alkyl and alkenyl groups having from 7 to 17 carbon atoms; $R_2$ is an alkylene group having from 2 to 4 carbon atoms; $R_3$ is selected from the group consisting of H, alkyl and alkanol groups having from 2 to 4 carbon atoms; and X is selected from the group consisting of OH and H; and from about 3 percent to about 10 percent by weight of a reinforcing filler.

6. The composition of claim 5 in which the reinforcing filler is dry asbestos.

7. The composition of claim 5 in which the clay is attapulgite.

8. A composition for filling joints which is substantially free from sag at elevated temperatures consisting essentially of from about 15 percent to about 40 percent by weight of comminuted gilsonite suspended in from about 40 percent to about 60 percent by weight of a paraffinic oil; from about 5 percent to about 20 percent by weight of a naturally occurring colloidal clay having a surface area of at least 50 square meters per gram colloidally dispersed therein; from about 10 percent to about 50 percent, based on the weight of said clay, of a fatty acid alkanolamide of the following structural formula:

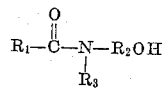

wherein: $R_1$ is selected from the group consisting of alkyl and alkenyl groups having from 7 to 17 carbon atoms; $R_2$ is an alkylene group having from 2 to 4 carbon atoms; and $R_3$ is selected from the group consisting of H, alkyl and alkanol groups having from 2 to 4 carbon atoms; and from about 3 percent to about 10 percent by weight of a reinforcing filler.

9. The composition of claim 8 in which the reinforcing filler is dry asbestos.

10. The composition of claim 8 in which the clay is attapulgite.

11. A composition for filling joints which is substantially free from sag at elevated temperatures consisting essentially of about 50 parts by weight of light white mineral oil, about 30 parts by weight of gilsonite suspended in said oil, about 13 parts by weight of colloidal clay having a surface area of at least 50 square meters per gram colloidally dispersed therein; from about 20 percent to about 40 percent, based on the weight of said clay, of a fatty acid amide of the following structural formula:

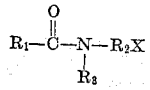

wherein: $R_1$ is selected from the group consisting of alkyl and alkenyl groups having from 7 to 17 carbon atoms; $R_2$ is an alkylene group having from 2 to 4 carbon atoms; $R_3$ is selected from the group consisting of H, alkyl and alkanol groups having from 2 to 4 carbon atoms; and X is selected from the group consisting of OH and H; and a reinforcing filler.

12. The composition of claim 11 in which the reinforcing filler is dry asbestos.

13. The composition of claim 11 in which the clay is attapulgite.

14. A composition for filling joints, which is substantially free from sag at elevated temperatures consisting essentially of about 50 parts by weight of light white mineral oil, about 30 parts by weight gilsonite suspended in said oil, about 13 parts by weight of colloidal attapulgite clay colloidally dispersed therein, from about 20 percent to about 40 percent, based on the weight of said attapulgite clay of a fatty acid alkanolamide of the following structural formula:

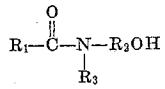

wherein: $R_1$ is selected from the group consisting of alkyl and alkenyl groups having from 7 to 17 carbon atoms; $R_2$ is an alkylene group having from 2 to 4 carbon atoms; $R_3$ is selected from the group consisting of H, alkyl and alkanol groups having from 2 to 4 carbon atoms; and about 3 parts by weight of dry asbestos.

15. A process for preparing a joint filling composition which is substantially free from sag at elevated temperatures consisting essentially of forming an apparently homogeneous ungelled mixture of from about 5 percent to about 20 percent by weight of colloidal clay having a surface area of at least 50 square meters per gram; from about 40 percent to about 60 percent by weight of a paraffin oil; and from about 10 percent to about 50 percent, based on the weight of said clay, of a fatty acid amide of the following structural formula:

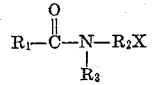

wherein: $R_1$ is selected from the group consisting of alkyl and alkenyl groups having from 7 to 17 carbon atoms; $R_2$ is an alkylene group having from 2 to 4 carbon atoms; $R_3$ is selected from the group consisting of H, alkyl and alkanol groups having from 2 to 4 carbon atoms; and X is selected from the group consisting of OH and H; adding from about 15 percent to about 40 percent by weight of powdered gilsonite to the mixture, and subjecting the mixture thus formed to high shear milling thereby to form a heat stable gel-like material.

References Cited in the file of this patent

UNITED STATES PATENTS

| | | |
|---|---|---|
| 2,389,680 | Mikeska | Nov. 27, 1945 |
| 2,438,318 | Johnson | Mar. 23, 1948 |
| 2,461,971 | Fischer | Feb. 15, 1949 |
| 2,894,848 | Goodwin | July 14, 1959 |